United States Patent [19]

Vander Laan et al.

[11] 4,159,105
[45] Jun. 26, 1979

[54] SHOCK ABSORBER WITH ADJUSTABLE SPRING LOAD

[76] Inventors: John S. Vander Laan; Robert A. Bouvier, both of 4931 Encinita St., Temple City, Calif. 91780

[21] Appl. No.: 879,789

[22] Filed: Feb. 21, 1978

[51] Int. Cl.² .................. F16F 9/44; F16F 13/00
[52] U.S. Cl. ..................... 267/8 R; 60/481; 137/630.2; 180/32; 267/177; 280/710; 280/724; 417/443
[58] Field of Search ............... 267/175, 177, 34, 64 B, 267/8 R; 180/32; 280/710, 712, 724; 137/630.19, 630.2; 417/443; 60/481

[56] References Cited

U.S. PATENT DOCUMENTS

| 2,254,084 | 8/1941 | Nilson | 417/443 |
| 2,815,731 | 12/1957 | Curtis | 417/443 X |
| 2,892,636 | 6/1959 | Walker | 280/710 |
| 3,331,599 | 7/1967 | Polhemus et al. | 267/34 |
| 3,385,589 | 5/1968 | Erdmann | 267/34 |
| 3,628,810 | 12/1971 | Graef | 267/34 X |

Primary Examiner—George E. A. Halvosa
Attorney, Agent, or Firm—Edgar W. Averill, Jr.

[57] ABSTRACT

A device for modifying a shock absorber so that the preload of the shock absorber spring may be adjusted. The device has a chamber member having a cylindrical inner member with an inside diameter slightly larger than the outside diameter of the shock absorber body. The chamber also has a cylindrical outer member sealingly attached at the upper end to the inner member. A piston is slidingly positioned in the chamber between the outer and inner cylinders and the piston forms a seat for the shock absorber spring. Hydraulic fluid is pumped into the chamber and by the addition of hydraulic fluid the spring of the shock absorber is compressed and the amount of preload between the shock absorber's relatively moveable parts is thereby increased.

10 Claims, 6 Drawing Figures

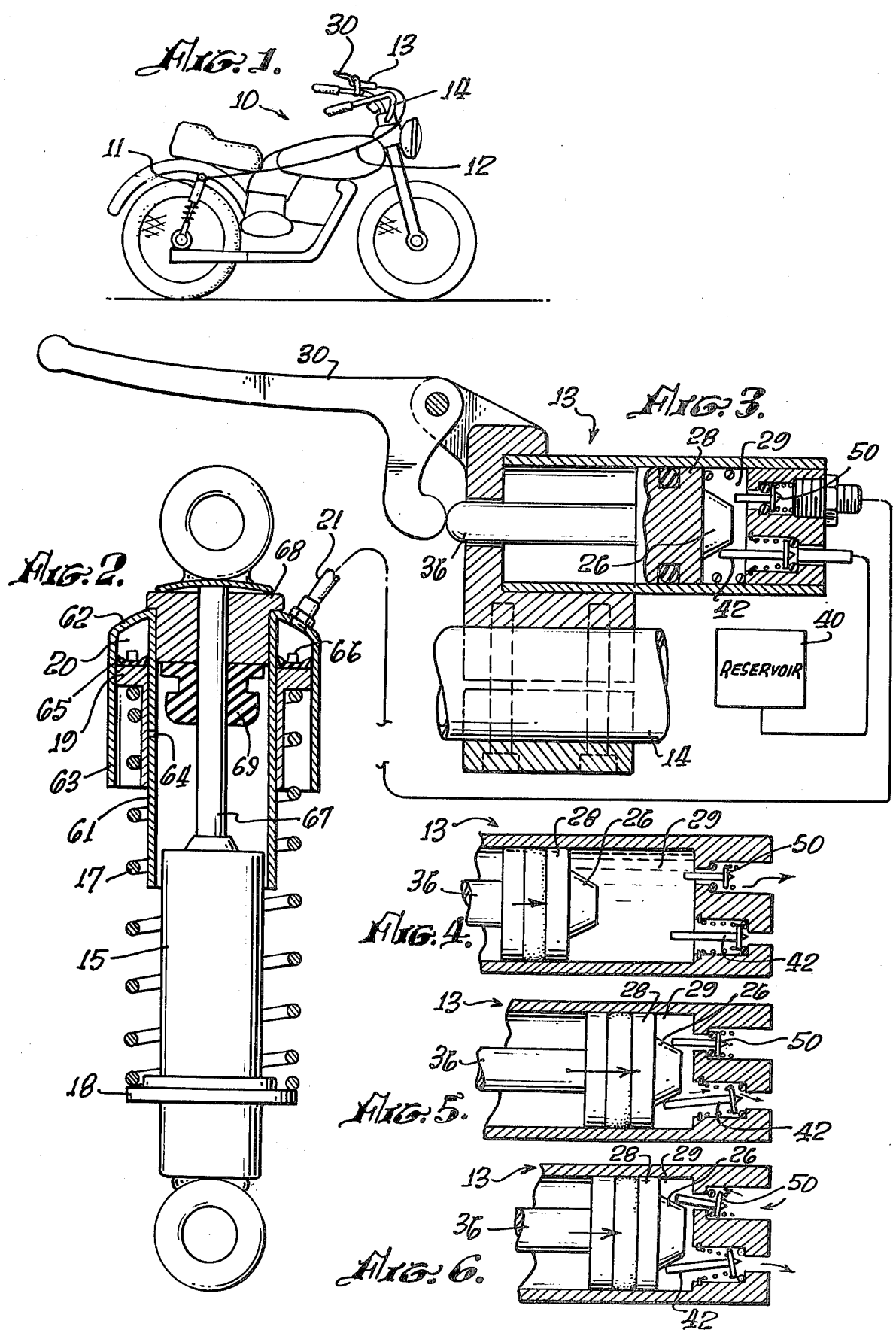

SHOCK ABSORBER WITH ADJUSTABLE SPRING LOAD

CROSS REFERENCE TO RELATED APPLICATIONS

The present application is being filed on the same day as an application for a single control hydraulic pump with pressure bleed, Ser. No. 879,790.

BACKGROUND OF THE INVENTION

The field of the invention is shock absorbers and the invention relates more specifically to shock absorbers for motorcycles and other small vehicles which are typically provided with springs mounted to the shocks.

Unlike automobiles, most motorcycles are suspended by springs which are an integral part of two pairs of shock absorbers. Various means have been used to adjust the level to which a shock absorber spring will suspend a motorcycle. Some motorcycle shock absorbers are equipped with a three or five step spring seat whereby the spring preload may be set by use of a wrench. In order to facilitate adjustment, another and different approach at shock absorber leveling has resulted from the use of a gas filled bladder positioned between the relatively moveable parts of the shock absorber. By partially inflating the bladder the amount of pressure between the relatively moveable parts of the shock absorber is increased and the shock absorber will hold the motorcycle in a slightly higher position, or restore any position lost as a result of loading.

The adjustment of the spring seat by use of a wrench is useful in initially setting up the motorcycle but cannot be used while the motorcycle is in use. Furthermore, if the motorcycle is equipped with saddlebags, spring seat adjustment is very time consuming. The use of a gas bladder requires stopping at a source of pressurized air for adjustment. Of course if the bladder is punctured or otherwise has a gas leak, the leveling capacity is lost.

A system is needed to permit load leveling adjustment, which adjustment can be made during the riding of the motorcycle. Since road conditions vary from a level freeway to a road with a steep grade, the requirements of the shock absorber can vary during the same trip even with the same load. Of course, when motorcycle loads are changed this need for shock absorber adjustment is more critical as, for instance with the addition of a passenger.

SUMMARY OF THE INVENTION

It is an object of the present invention to provide a shock absorber which is capable of preload adjustment during riding of the vehicle.

It is a further object of the present invention to provide a means for converting an existing shock absorber to a shock absorber having load leveling capabilities.

The present invention is for a shock absorber having a chamber member with a cylindrical inner member having an inside diameter slightly larger than the outside diameter of the body of the shock absorber to which it is attached. The chamber member also has a cylindrical outer member sealingly attached at the upper end to form a fluid-tight chamber. Piston means are slidingly positioned in the fluid-tight chamber and have a spring seat along its lower surface. Spring means are positionable along the lower surface of the piston means and also at the bottom of the shock absorber. Hydraulic fluid is held within the fluid-tight chamber and conduit means are attached to the chamber for conducting fluid to and from the chamber. Addition of the fluid to the chamber compresses the shock absorber spring thereby increasing shock absorber preload which, in turn, relatively displaces the sprung and unsprung parts of the vehicle.

The term "shock absorber" as used herein means a hydraulic damping device to which a spring is affixed for the purpose of providing shock and vibration isolation between the sprung and unsprung parts of the vehicle and further to provide static positioning between said parts. The unsprung parts consist the wheels and swing arm with the frame being the sprung part.

BRIEF DESCRIPTION OF THE DRAWINGS

FIG. 1 is a side view of a motorcycle having the shock absorber of the present invention attached to the rear wheel thereof.

FIG. 2 is a side elevational view, partly in cross-section of the shock absorber of the present invention.

FIG. 3 is an enlarged cross-sectional view of a fluid pump useful with the shock absorber of the present invention.

FIG. 4 is a cross-sectional side elevation of the pump body of the pump of FIG. 3.

FIG. 5 is a cross-sectional side elevation of the pump body of the pump of FIG. 3.

FIG. 6 is a cross-sectional elevation of the pump body of the pump of FIG. 3.

DESCRIPTION OF THE PREFERRED EMBODIMENTS

A motorcycle is generally indicated by reference character 10 in FIG. 1 of the drawings. The motorcycle has a pair of rear shock absorbers. The right hand shock absorber 11 is connected through a hydraulic line 12 to a pump 13 which is clamped onto handlebars 14. An identical shock absorber is affixed to the left hand side of the motorcycle and is not shown. The shock absorber of the present invention is shown in FIG. 2. The shock body 15 is of a conventional design and has a conventional spring seat 18. The spring 17 would typically be slightly different than the conventional spring. The spring rate of spring 17 would be quite similar to the conventional spring, however. At the upper end of spring 17 is a piston 19 above which is a hydraulic chamber 20 connected to a hydraulic line 21. The term "upper" as used herein refers to the position of the shock absorber of FIG. 2.

Hydraulic chamber 20 is made from an inner cylindrical member 61 which terminates at its upper end in an end ring 62, which is integral with an outer cylindrical member 63. The chamber may be made from an integral part which may be deep drawn or machined. Inner member 61, and ring 62 and outer member 63 form an annular chamber referred to as hydraulic chamber 20. Chamber 20 may be fabricated from stainless steel, aluminum, or plastic as long as the material of construction has sufficient strength to withstand the pressure existing within chamber 20. The inner cylindrical member 61 has a bleed hole 64 which functions in the event that the piston 19 is forced below its maximum downward position from being forced outside of chamber 20.

A hydraulic seal 65 is positioned on the upper surface of piston 19 and functions to hold the hydraulic fluid within chamber 20 and prevent leakage from chamber 20 to the outside thereof. A seal bumper ring 66 is positioned on the top of seal 65 and helps prevent deformation of this seal when the hydraulic fluid is removed from chamber 20.

Hydraulic chamber 20 is held to the stanchion or piston rod 67 of the shock absorber by a cylinder retainer 68. A bottoming bumper 69 is affixed to the cylinder retainer 68 and cushions the contact between shock body 15 and travel limiter 78 in the event of a bottoming out of the shock absorber.

In operation, a hydraulic pump such as pump 13 is connected to hydraulic line 21, and as the hydraulic fluid volume is increased in chamber 20, piston 19 moves downwardly, increasing the spring preload. Conversely, when hydraulic fluid is allowed to flow out of hydraulic chamber 20, piston 19 moves upwardly and the spring preload is reduced.

Pump 13 is of an especially useful design in that it permits both pumping and bleeding by movement of the same handle 30. The function of this pump is described in applicant's copending application, Ser. No. 879,790 filed Feb. 21, 1978, which description is incorporated by reference herein. Briefly, handle 30 contacts piston rod 36 which in turn is attached to piston 28. The fluid chamber 29 is filled with fluid from reservoir 40. A fluid inlet valve 42 allows entry of fluid from reservoir 40 and pressurized fluid passes out around valve 50 into hydraulic line 21 and hydraulic chamber 20. The fluid is expelled from hydraulic chamber 20 when the piston 28 with its frustroconical protrusion 35 contacts valves 42 and 50 as shown in FIG. 6 of the drawings. Since the fluid in hydraulic chamber 20 is under pressure caused by the contact with spring 17, the fluid tends to flow outwardly through hydraulic line 21, fluid chamber 20 and into reservoir 40 which is held at atmospheric pressure.

Other hydraulic pumps may be used with the shock absorber of the present invention. For instance, the pump could be electrically operated or of a different design. It is advantageous that the motorcycle rider has the ability to add or remove hydraulic fluid from hydraulic chamber 20 so that he may adjust the spring preload of the shock absorber to an ideal position in harmony with the road conditions over which he is riding, and to compensate for varying loads.

While the shock absorber 11 has been shown as useful as a rear shock absorber of a motorcycle, a similar shock absorber could be used in a modified form as a front suspension unit of a motorcycle. That is, the spring preload of the front suspension unit could be similarly adjustable to the shock absorber design shown for shock absorber 11.

A substantial advantage of the present invention is that the shock absorber body and inner workings are of a conventional design and prior art existing shock absorbers may readily be used. An existing shock absorber can be converted to an adjustable shock absorber merely by the changing of the typical split ring with a travel limiter and cylinder retainer such as shown as retainer 68 in the drawings and the addition of the hydraulic chamber assembly described above. The spring, as stated above, should also be changed to optimize the operation of the assembly. Thus it could be unnecessary for the motorcycle owner to discard his old shock absorbers as they could, instead, be modified.

The present embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

What is claimed is:

1. A device for modifying a shock absorber so that the preload of the shock absorber may be adjusted while the vehicle to which it is attached is in motion, said device comprising:

a chamber member having a cylindrical inner member having an inside diameter slightly larger than the outside diameter of the shock body and having a cylindrical outer member sealingly attached at the upper end to said inner member and forming a chamber between its inner surface and the outer surface of the inner member and positioned coaxially therewith;

piston means slidingly positioned in said chamber and dividing said chamber into a fluid tight chamber portion and another open chamber portion, said piston means having a spring seat along its lower surface;

spring means positioned along its upper end in said another chamber portion and extending downwardly therefrom;

hydraulic fluid held within said fluid tight chamber portion;

conduit means attached to said chamber member for conducting hydraulic fluid to and from said chamber member; and a pump affixed to said conduit means, said pump having a handle which actuates a piston located at one end of a fluid cylinder, said fluid cylinder being affixed both to said conduit means and to a fluid reservoir, the pump having valve means which controls the flow of fluid to and from the chamber member of the shock absorber into said fluid reservoir, thereby altering the preload of the shock absorber.

2. The device of claim 1 wherein said cylindrical inner member has a fluid bleed opening passing through the inner wall thereof, said opening being positioned at the upper surface of the piston means when said piston means is in its maximum downward position whereby said hydraulic fluid will pass through said opening when said piston has reached its maximum downward position.

3. The device of claim 1 further including seal means located on the upper surface of said piston means.

4. The device of claim 1 further including shock absorber means attached to said device, said shock absorber means having its piston rod end attached to said chamber member and its shock body end having a spring seat affixed thereto which holds the lower extremity of said spring means.

5. The device of claim 4 wherein said inner member of said chamber member extends sufficiently downwardly of said shock absorber to surround the upper portion of the body of said shock absorber means.

6. The device of claim 1, wherein said handle is a hand-operated handle which in its fully depressed position opens said valve means, allowing the fluid to flow from said chamber member to said fluid reservoir.

7. The device of claim 6 wherein said valve means are opened by contact with the piston.

8. The device of claim 7 wherein the end of said piston is frustroconical.

9. The device of claim 8 wherein said valve means are opened by contact with the frustroconical end of the piston.

10. The device of claim 1 wherein said pump is affixed to the handlebars of a motorcycle.

* * * * *